May 30, 1933.  N. BARR ET AL  1,911,176

METHOD OF COLORING FLEXIBLE ARTICLES

Filed Oct. 18, 1929

Inventors.
Nett Barr and
Randolph J. Dorn
Kin Hudson & Kent
attys

Patented May 30, 1933

1,911,176

UNITED STATES PATENT OFFICE

NELT BARR AND RANDOLPH J. DORN, OF SANDUSKY, OHIO, ASSIGNORS TO THE BARR RUBBER PRODUCTS COMPANY, OF SANDUSKY, OHIO, A CORPORATION OF OHIO

METHOD OF COLORING FLEXIBLE ARTICLES

Application filed October 18, 1929. Serial No. 400,511.

This invention relates to a new and improved method for applying coloring material or materials to flexible articles to produce the effect of irregular artistic coloring upon the surfaces of the articles.

An object of the invention is to provide a method whereby the expense in connection with the production of articles of this particular character is reduced to a minimum, and at the same time, the resultant article has a materially improved appearance over articles of a similar character.

With the objects above indicated and other objects hereinafter explained in view, the invention consists in the improved process, as will be more fully described hereinafter.

Referring to the drawing.

While the method of coloring articles hereinafter referred to may be employed in connection with a variety of flexible articles, the description herein will refer to the coloring of rubber balloons, which is one of the flexible articles adapted to be produced in accordance with the method, and it is to be understood that the invention is not limited to use in connection with rubber balloons.

The usual steps in the manufacture of balloons comprises taking the crude rubber and mixing therewith the desired coloring matter of any selected base color which are mingled together with naphtha in an ordinary rubber milling machine for the required time, to thereby produce a rubber colored solution having the desired consistency and base color. The balloon is then produced by dipping the conventional balloon form into the rubber colored solution, which form is ordinarily a piece of wood of elongated or egg-shape with a stem formed at one end, and in this condition, the rubber of the balloon is then cured in the usual manner.

After the balloons have been substantially cured, they are removed from the forms and gathered together in a suitable container from whence they may be taken as required. The method of forming rubber balloons or other rubber articles so far described embodies the usual practice and does not, therefore, form any part of the present invention but is for the purpose of more readily understanding the invention and where the method embodying the same is carried on.

The cured balloons are next taken and dipped or submerged individually or en masse in a suitable solution, preferably caustic soda which I have here termed an alkali, which coacts with the rubber balloons in such a manner as to prevent any appreciable running or spreading of the dyes when applied to the balloons to thereby produce sharp clear lines upon the resultant articles, as well as blended colors, and furthermore to retain a clear portion of the base color.

Figure 2:
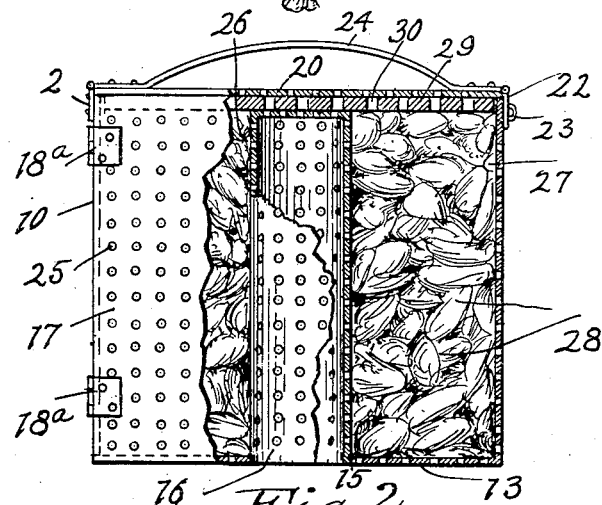
Fig. 2 illustrates a device, part of which is broken away and by which the balloons may be produced according to the method.
Figure 3:
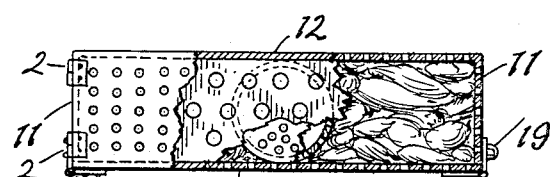
Fig. 3 is a top plan view of the device shown in Fig. 2 and part of which is broken away.

After the balloons have been thus treated and are dry, a quantity of balloons are preferably placed in a container such as shown in Figs. 2 and 3, in a promiscuous manner whereby they assume an irregular crumpled condition. They are then maintained in this relation by suitable pressure and while so maintained, are subjected to the desired coloring material being applied in any desirable manner. The preferred manner of applying the coloring material is, however, by submerging the container filled with the balloons or other rubber articles, in coloring solutions of any desired colors.

The preferred colors are oil soluble dyes, in yellow, red and blue, and the container and contents are submerged preferably in the herein stated sequence. The dyes are mixed preferably with naphtha so that the latter when in contact with the rubber balloons will cause them to swell or expand sufficiently to prevent the color from spreading. This results in color lines upon the balloons which are decidedly sharp so that one color will be distinguishable over the other. The swelling is also sufficient to shift the position of the balloons within the container so as to present different surfaces to the color solution.

The dipping or submerging operations take place successively and without rearrangement of the balloons or other rubber articles being colored.

It has been found by actual experimenting that by dipping the articles first in yellow, then red and then blue, the best results are produced inasmuch as the darker colors will show up over the yellow while the yellow, if applied after the application of the darker colors, does not appear on the resultant article so prominently.

It is understood, of course, that one or more colors may be applied to the balloons or other articles, while in this irregular crumpled condition with the same result of producing upon the article, when released and removed, an irregular configuration of which no two balloons are alike.

Figure 1:
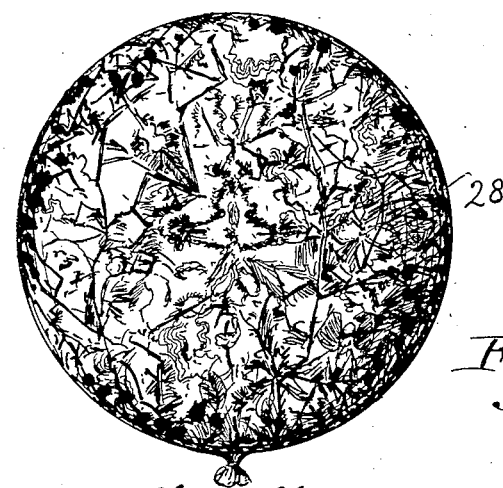
Fig. 1 illustrates a balloon produced in accordance with the method of embodying our invention.

In carrying out the invention, we provide a suitable container such as is shown in Figs. 1 and 2 and which forms the subject matter of our copending application Serial No. 400,512, filed October 18, 1929.

The container which is designated 10 is of metal or other suitable material and comprises end members 11, a back 12 and a bottom 13, all preferably formed integral, and of any desired size or shape. The bottom 13 has a transversely extending opening 15 of a diameter substantially the depth of the bottom 13. A tubular member 16 closed at its upper end has its lower open end disposed within the opening 15 and may be attached to the bottom adjacent the opening by soldering or any other suitable means.

The tubular member extends upwardly within the container 10 and to a position adjacent the upper portion of the container for a purpose to be later described.

The container 10 is further provided with a front cover member 17 which is pivotally connected along one of its edges to one of the end members 11 by means of hinges 18a. Adjacent the opposite edge is attached a hasp 18 which cooperates with an eye 19 secured to the adjacent end member for retaining the front cover member in closed position.

A top member 20 is hingedly connected at 21 to the upper end of one of the end members 11, while the opposite end has attached thereto a hasp 22 which cooperates with an eye 23 secured to the adjacent end member 11 to retain the top member in closed position. A handle 24 is attached preferably to the top member 20 for the purpose of enabling the container to be moved about conveniently and during the dipping operations.

The entire container is preferably perforated as at 25 as well as the tubular member 16 to thereby permit the coloring solution to have ready access to the interior of the container.

The tubular member 16 divides the container 10 into two compartments 26 and 27 which receive the balloons 28 or other articles to be colored.

With the front cover 17 closed but the top member 20 open, balloons 28 are placed promiscously and in irregular crumpled condition within the compartments 26 and 27 until they are entirely filled, at which time a member 29 having transverse openings 30 is placed within the top of the container 10 in contact with the mass of assembled balloons or other articles. The top 20 is then closed and fastened thereby maintaining the member 29 in proper position with relation to the balloons to thereby produce sufficient pressure to hold the balloons in this irregular crumpled condition.

In this condition, the container with its contents is submerged in the coloring solution which readily reaches the balloons or other articles through the perforations 25.

The container is preferably first submerged in the yellow coloring solution, immediately withdrawn, permitted to drain until the majority of the solution has run off, submerged in the red coloring solution, immediately withdrawn, permitted to drain off as before, and subsequently submerged in the blue coloring solution, immediately withdrawn, and permitted to drain. This operation continues depending upon the number of colors it is desired to apply to the balloons. The container is then opened and the balloons or other rubber articles removed with the result that the articles are substantially covered with an irregular configuration of various colors of which no two articles have identically the same design.

While we have described the preferred apparatus for carrying out the method, it is to be understood that many other apparatuses may be employed to produce the desired result and the invention is therefore not limited thereto but reference should be had to the appended claims for the broader aspects of the invention.

Having thus described our invention, what we claim is:

1. The method of coloring flexible rubber articles which consists in treating the articles with a caustic alkaline solution and applying coloring material to a plurality of the articles while maintained in irregularly crumpled condition.

2. The method of coloring flexible rubber articles which consists in treating the articles with a solution of caustic soda and applying coloring material to a plurality of articles while maintained in irregularly crumpled condition.

3. The method of coloring flexible articles which consists in treating the articles with a solution of caustic soda and assembling in a mass a plurality of articles in irregularly crumpled condition and while so assembled applying coloring material.

4. The method of coloring flexible rubber articles which consists in treating the articles with a caustic alkaline solution, assembling a plurality of the articles in irregularly crumpled condition and while so assembled applying in sequence coloring materials.

5. The method of coloring flexible rubber articles which consists in treating the articles with a caustic alkaline solution, assembling a plurality of the articles in irregularly crumpled condition and while so assembled applying in sequence oil soluble dyes and naphtha in solution.

6. The method of coloring vulcanized rubber balloons which consists in treating the balloons with a caustic alkaline solution, assembling a plurality of the balloons so treated in an irregularly crumpled condition and while so maintained applying oil soluble dyes in solution with naphtha successively.

In testimony whereof, we hereunto affix our signatures.

NELT BARR.
RANDOLPH J. DORN.